Figure 1:
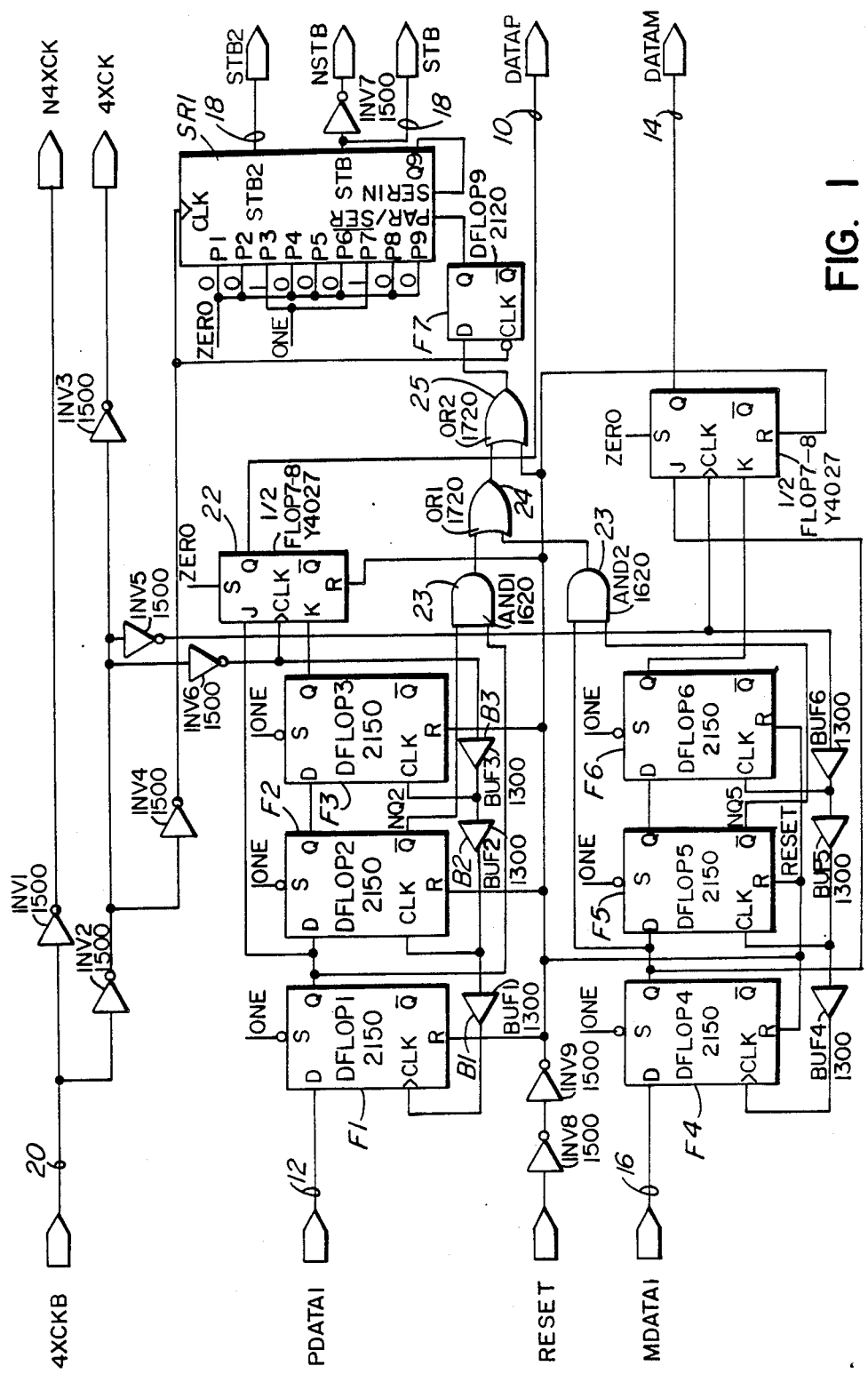

United States Patent [19]

Robidoux et al.

[11] Patent Number: 4,706,033

[45] Date of Patent: Nov. 10, 1987

[54] DATA RECOVERY AND CLOCK CIRCUIT FOR USE IN DATA TEST EQUIPMENT

[75] Inventors: Richard R. Robidoux; Ronald B. Hoverman, both of Concord, N.H.

[73] Assignee: Northern Telecom Limited, Montreal, Canada

[21] Appl. No.: 865,087

[22] Filed: May 20, 1986

[51] Int. Cl.[4] .......................... H04L 7/00; H03K 5/05
[52] U.S. Cl. ........................................ 328/139; 328/55;
328/75; 328/74; 307/269
[58] Field of Search .................. 328/55, 60, 61, 63,
328/72, 74, 75, 155, 139; 307/269

[56] References Cited

U.S. PATENT DOCUMENTS

| | | | |
|---|---|---|---|
| 3,593,160 | 7/1971 | Moore | 328/72 |
| 3,925,613 | 12/1975 | Kokado | 328/139 |
| 3,942,124 | 3/1976 | Tarczy-Hornoch | 328/63 |
| 3,962,540 | 6/1976 | Kokado | 328/139 |
| 3,980,820 | 9/1979 | Niemi et al. | 328/63 |
| 4,618,787 | 10/1986 | Jacksier et al. | 328/55 |

Primary Examiner—John S. Heyman
Attorney, Agent, or Firm—Schwartz, Jeffery, Schwaab, Mack, Blumenthal & Evans

[57] ABSTRACT

A digital data and clock recovery circuit for use in a digital test head has a digital input port and a digital output port. A clock having a frequency several times the nominal bit rate of the input data drives several series-connected flip flops to generate a corresponding output pulse stream in which the pulses are of fixed pulse duration. Outputs are also taken from the flip flop array to generate a strobe pulse having a predetermined phase relationship to the output data pulses. The flip flop array operates on positive going pulses derived from a bipolar data input stream. An identical array is used to similarly condition negative going input data pulses, outputs from the arrays being combined to synchronize the strobe signal.

6 Claims, 4 Drawing Figures

DATA RECOVERY AND CLOCK CIRCUIT FOR USE IN DATA TEST EQUIPMENT

In a digital data test equipment a pseudo random digital data signal with a bit rate typically of 1.544 megabits/second is transmitted over a transmission channel under test and is received at a test set. At the test set, the bit error rate is determined to assess whether the transmission link is sufficiently good to remain in service. The line can also be tested for the presence of all 1 data pulses and for the absence of data signal. If an all 1's signal is present, or if no signal is present or if the error rate is greater than a preset threshold, then the link is taken out of service and repaired with a substitute channel being inserted while repair or replacement is under way.

At the test head, to facilitate the error tests, bits within the data stream are re-shaped and re-timed and a strobe signal is generated from the incoming signal. The strobe signal is subsequently used to clock the data through the test locations and to synchronize the passage of data through the test set with a test operation.

In re-timing and reshaping an input pulse stream it is known to use phase locked loops characterized by voltage controlled oscillators. Such loops are relatively complex and are used for example in repeaters where phase jitter should be minimized. For test sets, although it is desired to re-time and re-shape the data to facilitate tests for bipolar variation, all 1's, or 0 signal conditions, the presence of phase jitter is not material. For such applications a tank circuit has been used to develop a strobe signal from the incoming data but one disadvantage of using a tank circuit is that unless a high Q tank circuit is used, the strobe signal can be lost when the input signal has an unduly long series of consecutive 0's. Moreover such tank circuits cannot be easily fabricated as part of a silicon integrated circuit because of the presence of inductive and capacitive elements.

According to one aspect of the invention, there is provided a clock recovery circuit comprising a digital data input port and a digital data output port, a plurality of series-connected bistable elements, means for applying input digital data to the first of said bistable elements, clock means for ripple clocking a pulse corresponding to each input pulse through said series-connected bistable elements, said clock having a frequency several times the nominal bit rate of said input data stream, first gate means for generating a fixed duration pulse corresponding to each input pulse from first and second outputs of the bistable array, and second gate means for generating from a third and fourth output of the bistable array a strobe pulse stream, the strobe pulses having a predetermined phase relationship to the fixed duration data output pulses.

Preferably a $4 \times n$ clock is used having a frequency four times the nominal bit rate of input data. To cause output data corresponding to the input data to ripple through the bistable array, each of the bistable elements can be clocked by the $4 \times n$ clock where n is the nominal input data bit rate. Buffer means can be located between successive bistable elements in the array to ensure that the pulse is moved sequentially through the array. Preferably there are three series-connected bistable elements within said bistable array.

A fixed duration pulse can be derived at a JK bistable element by applying the outputs respectively of the first and third bistable elements to the JK elements of the bistable element. In this way regardless of whether an input pulse is present for one, two or three cycles of the $4 \times n$ clock, an output pulse having a fixed duration of 2 clock cycles is emitted from the bistable element.

Preferably a strobe pulse of one clock cycle duration is generated such that each output pulse and its corresponding strobe pulse have coincident start times, by taking an inverted output from the second bistable element together with the output of the first bistable element to an AND gate and then through a bistable element.

Particularly for bipolar input data the bipolar pulse stream can be split into positive and negative going pulse streams the negative going pulse stream being processed identically with the positive going pulse stream using a corresponding array of series-connected bistable elements. The output of the AND gates of the first and second arrays can then be taken to an OR gate prior to the final bistable element.

Figure 2:
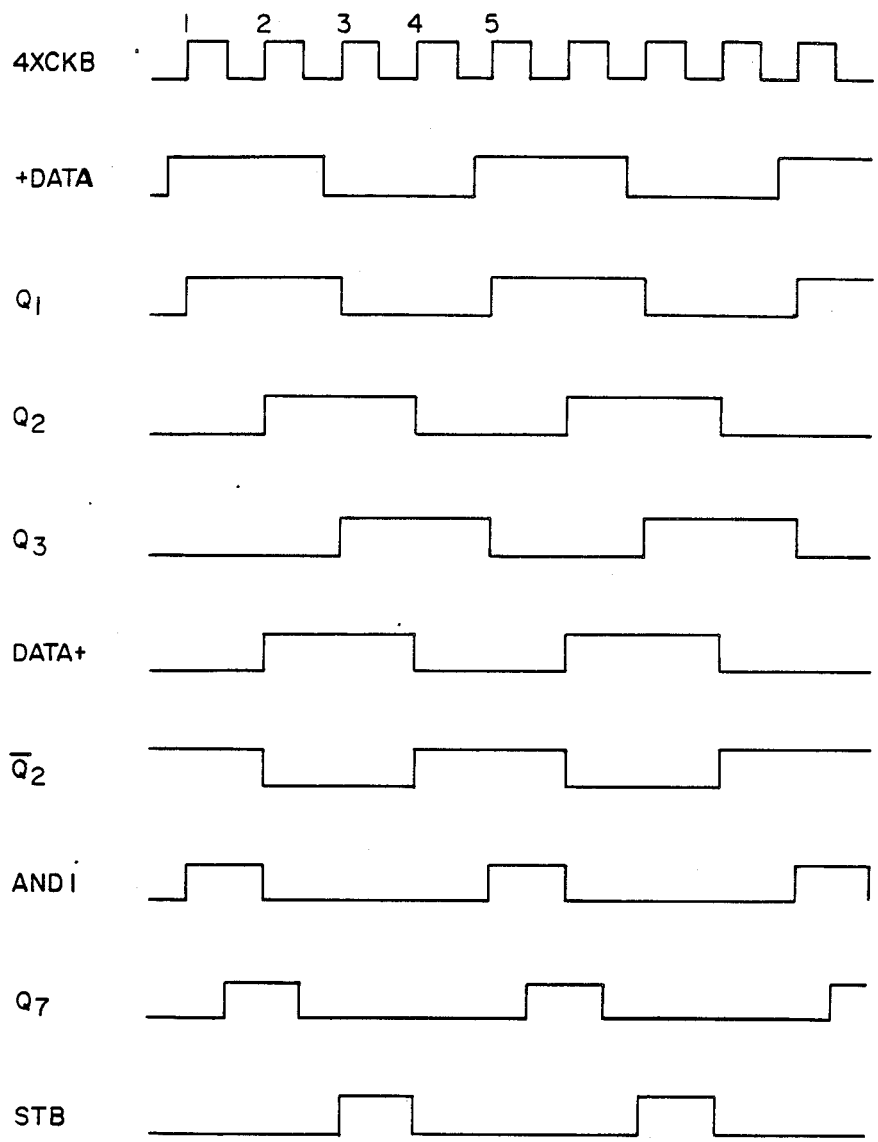
Figure 3:
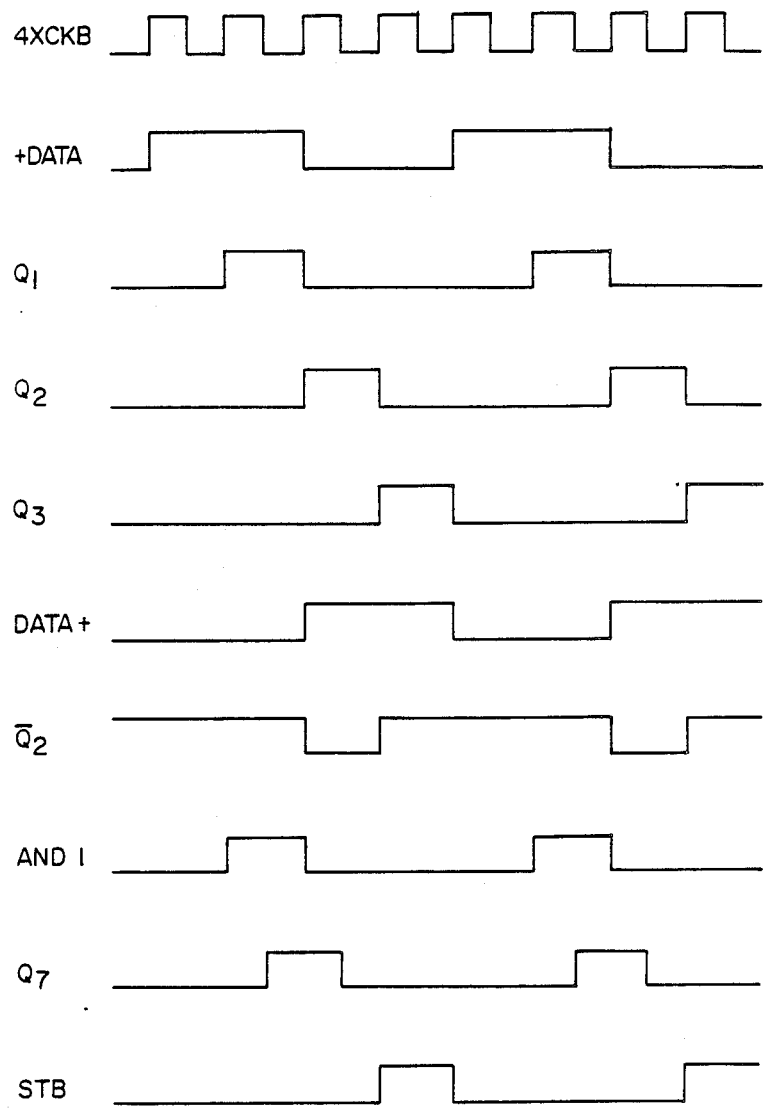
Figure 4:
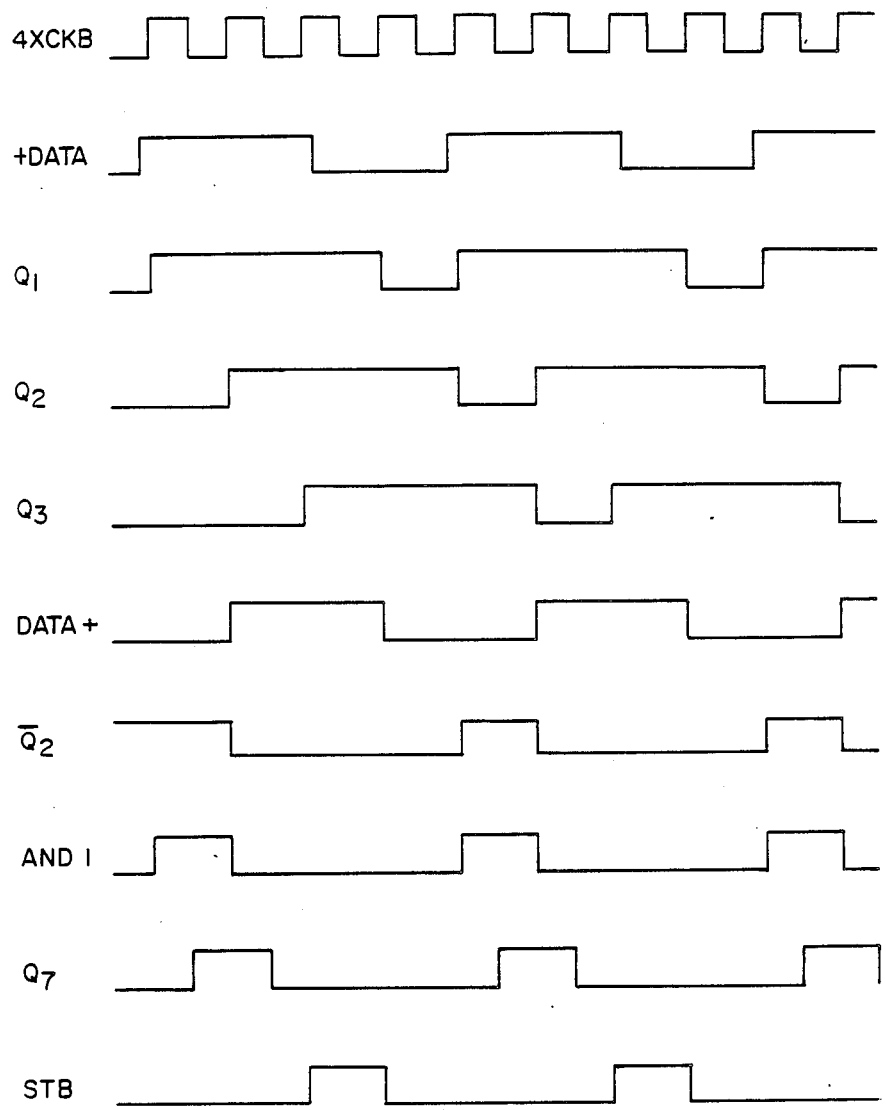

An embodiment of the invention will now be described by way of example with reference to the accompanying drawings in which:

FIG. 1 is a schematic diagram showing a circuit for recovering data and generating a strobe signal in response to input bipolar data; and FIGS. 2, 3 and 4 show timing diagrams corresponding to the processing of input data of varied pulse lengths.

Referring in particular to FIG. 1, the data and clock recovery system illustrated is operable to re-time and re-shape input pulses and to derive a clock or strobe signal whereby output data can be subjected to tests to ascertain whether an unacceptable error rate exists or whether an all 1's or 0 input condition is present.

The circuit consists of two arrays, each of three series-connected bistable elements F1, F2 and F3. Outputs from the bistable elements are combined to generate a positive data output 10 corresponding to positive data input stream 12, a negative data output 14 corresponding to a negative data input stream 16 and strobe outputs 18. The circuit is particularly adapted for use with bipolar data which prior to the circuit shown in the Figure is separated into positive and negative going pulses. The bistable elements are clocked by a clock 20 having a frequency $4 \times$ the nominal bit rate of the input data.

In operation, and considering only the positive going data pulses, the positive data is applied to the $D_1$ terminal of the first bistable element F1. At the next rising edge of the $4 \times$ clock which is delayed by buffers B1, B2, B3, the positive data 12 is clocked through to output $Q_1$ and appears at the input $D_2$ of the subsequent bistable. As shown in FIG. 2, for an input pulse of average width at subsequent successive clock cycles, the pulse is clocked successively through the bistables F2 and F3 to the K input terminal of a JK bistable 22. At the same time that Q1 goes high, the input J of bistable 22 goes high and on a subsequent clock cycle is clocked through to provide the rising edge of output data pulses. Each output data pulse terminates on the output of Q3 going high at input terminal K of the bistable 22. Thus, in essence, output pulses two clock cycles in duration are generated in time slot one clock pulse after the input data 12 is applied at the first bistable F1. Similarly negative going input data pulses 16 are used to generate corresponding fixed duration pulses through bistables F4, F5 and F6.

To generate the strobe signal 18 in response to the full data input, inverted outputs $Q_2$ and $Q_5$ are taken from the bistables F2 and F5 to respective AND gates 23 where they are combined with outputs Q1 and Q4. Consequently pulses one clock cycle in duration time slots immediately preceding the output data 10 and 14 is generated at the respective AND gates 23 and combined at an OR gate 24. The output of OR gate 24 is taken through another OR gate 25 to which a reset line is applied and reclocked at a bistable F7. The output of bistable F7 is taken to a shift register SR1 which is also driven by the 4×clock to generate a plurality of output strobe signals. Bistable F7 ensures synchronous operation of shift register SR1 by clocking F7 with the falling edge of 4×clock.

The respective waveforms shown in FIG. 2 correspond to an input pulse stream in which input pulses are of such length that they are present during two consecutive phases of the clock. As can be seen by corresponding waveforms in FIGS. 3 and 4 if the input pulse duration is either shorter or longer than the average pulse duration such that the input pulse is clocked either once or three times by the 4×clock, the bistable arrays operate to assign output pulses to a time slot corresponding to the most appropriate two cycles of the 4×clock. Further, the strobe pulses are generated with the same phase relationship relative to the reshaped output pulses. Although the clock frequency chosen is 4×the nominal data bit rate, a faster clock can be used. As previously indicated although signal jitter is not of major concern in a test head, it is desirable if the regenerated data signal accurately represents the input data. By using a clock frequency higher than 4×the nominal bit rate together with a longer array of bistables, jitter can be reduced.

What is claimed is:

1. A data and clock recovery circuit comprising a digital data input port and a digital data output port, a plurality of n series-connected bistable elements, means for applying input data pulses to the first of said bistable elements, clock means for ripple clocking the input data pulses through said series-connected bistable elements, said clock having a frequency (n) times the normal bit rate of said input data pulses, first gate means for generating a fixed duration data output pulse corresponding to each data input pulse from first and second outputs of the series-connected bistable elements, second gate means for generating from a third and fourth output of the series-connected bistable elements, a strobe pulse stream, the strobe pulses having a predetermined phase relationship to the fixed duration data output pulses, and buffer means located between successive ones of the series-connected bistable elements to ensure that the data input pulses are moved through the series-connected bistable elements in sequence with successive phases of the clock, wherein said first gate means comprises a bistable element, the fixed duration data output pulses are derived at the bistable element by applying outputs respectively of the first and nth series-connected bistable elements to the bistable element inputs whereby output data pulses having a fixed duration of n−1 clock cycles are emitted from the bistable element.

2. A circuit as claimed in claim 1 in which the third output of the series-connected bistable elements is also the first output thereof said second gate means comprising an AND gate to which the output of the first bistable and an inverted output from the second bistable are connected to generated an output strobe pulse having a 1 clock cycle duration and having a start time coincident with start times of the output data pulses.

3. A circuit a claimed in claim 1 which is particularly adapted for bipolar input data, in which bipolar data has been split into positive and negative going pulse streams, the circuit further comprising a second plurality of series-connected bistable elements and a third gate means, identical with the first plurality of series-connected bistable elements and the second gate means, respectively, the positive going pulse stream being applied to the first plurality of series-connected bistable elements and the negative going pulse stream being applied to the second plurality of series-connected bistable elements, the outputs of the second and third gate means being connected to an OR gate prior to a final bistable element.

4. A data recovery circuit comprising:
a plurality of n series-connected bistable elements,
means for applying an input digital bit stream to the first of the series-connected bistable elements;
clock means having a frequency at least n times the nominal bit rate of the input digital bit stream, for ripple clocking the digital bit stream through the series-connected bistable elements;
buffer means disposed between successive bistable elements to ensure the digital bits of the input digital bit stream are clocked through the series-connected bistable elements in sequence with successive phase of the clock; and
a bistable element having set and reset inputs connected to the respective outputs of the first and nth series-connected bistable elements to generate at its output an output digital bit stream which replicates that of the input digital bit stream, with each pulse of the output digital bit stream having a pulse duration of n−1 cycles of the clock means.

5. A circuit as claimed in claim 4 in which n=3 and the clock means has a frequency 4×the nominal bit rate of the input digital bit stream for ripple clocking the pulses corresponding to respective input pulses through three such series-connected bistable elements.

6. A circuit as claimed in claim 4, the circuit including a second plurality of n series-connected bistable elements identical to the first plurality of n series-connected bistable elements;
the circuit being particularly adapted for a bipolar input digital bit stream in which the bit stream has been divided into positive and negative going pulse streams which are applied respectively to the first and second plurality of bistable elements; and
a final bistable element which alternates states on consecutive input pulses which is responsive to pulses from the first and second plurality of bistable elements for generating a strobe pulse stream having a predetermined phase relationship to the output digital bit stream.

* * * * *